March 1, 1955     J. R. CARTWRIGHT     2,703,202
ELECTRONIC BINARY ALGEBRAIC ACCUMULATOR
Filed March 21, 1950     6 Sheets-Sheet 1

INVENTOR
JOHN R. CARTWRIGHT
BY
ATTORNEY

INVENTOR
JOHN R. CARTWRIGHT
ATTORNEY

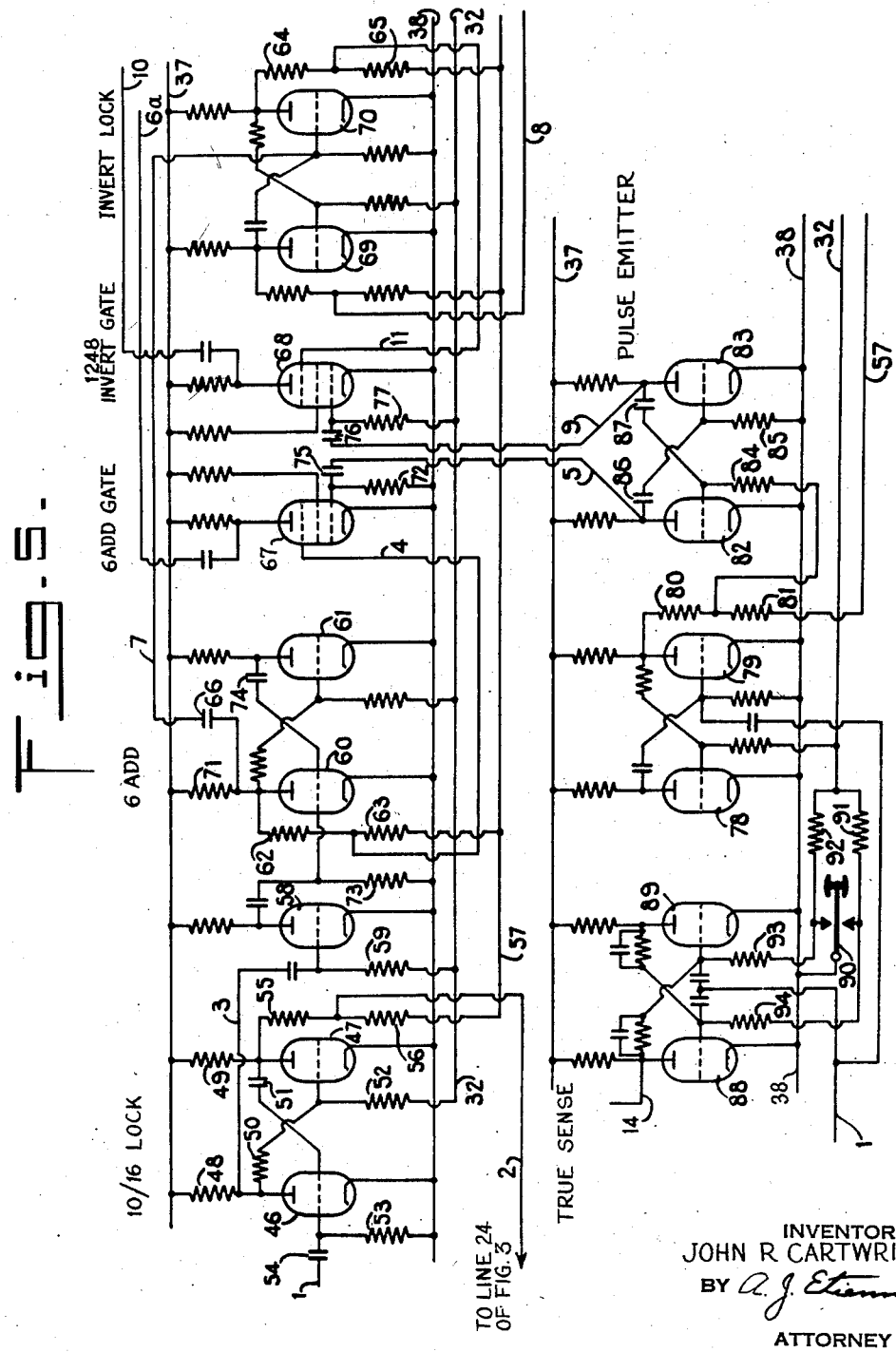

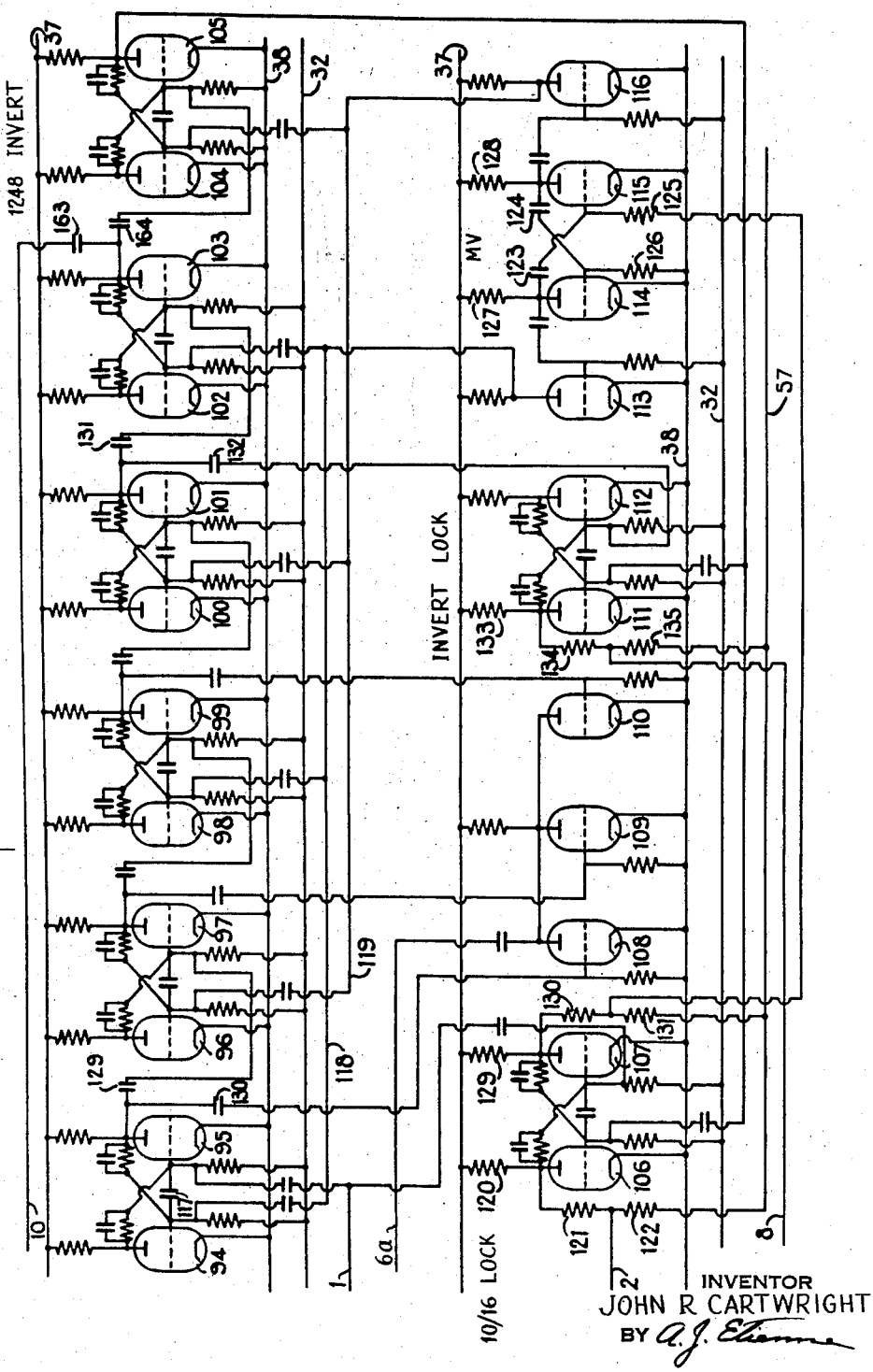

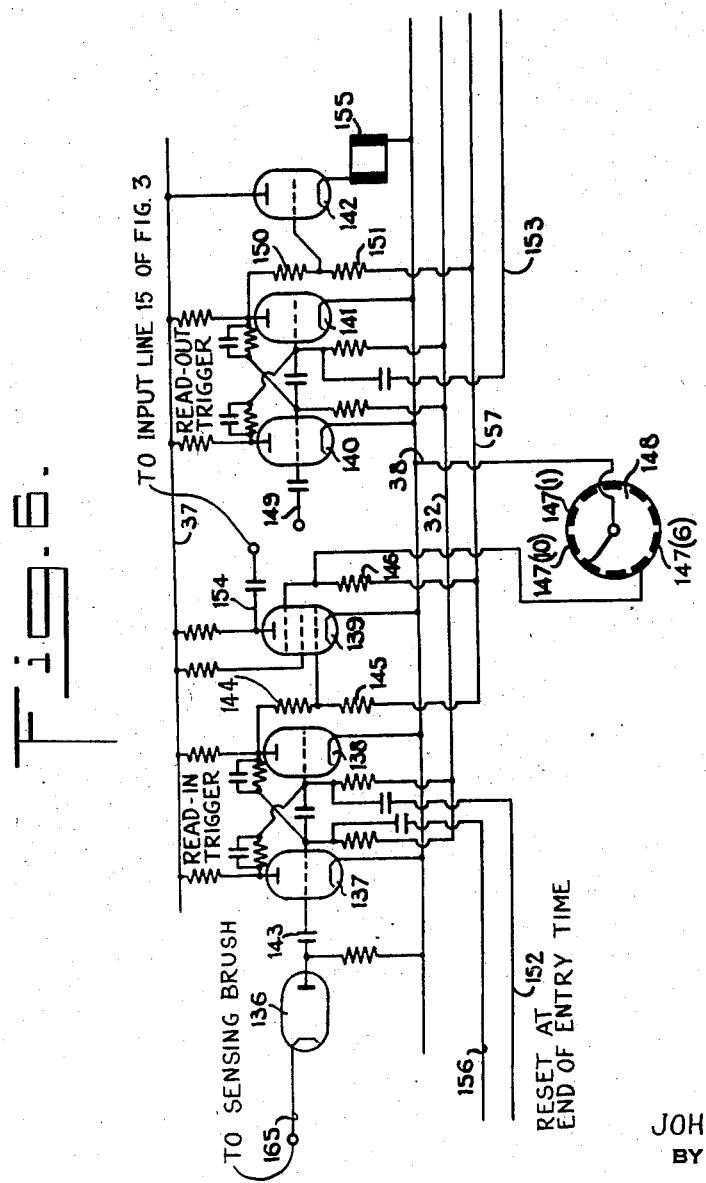

United States Patent Office 2,703,202
Patented Mar. 1, 1955

2,703,202

ELECTRONIC BINARY ALGEBRAIC ACCUMULATOR

John R. Cartwright, Letchworth, England, assignor to International Business Machines Corporation, New York, N. Y., a corporation of New York Application March 21, 1950, Serial No. 150,991

Claims priority, application Great Britain April 14, 1949

21 Claims. (Cl. 235—61)

The present invention relates to electronic counters representing values by combinations of sustained electrical conditions and particularly counters capable of internal adjustment of said combinations to provide means for both addition and subtraction within the counter itself.

It is well known to construct an adding electronic counter for a non-binary notation by employing a series of binary counting trigger stages and means to limit the counter capacity such that when the value entered is equal to the radix of the required notation, the counter is returned to zero and provides a carry impulse representing the value one in the next higher denomination. One such counter is described in British Patent No. 609,502, complete accepted October 1, 1948 in which four trigger stages representing the binary terms 1, 2, 4, 8 are employed to count in the decimal notation. A counter of this type, working in a notation with radix R and employing $n$ binary trigger stages, where $2^{n-1}<R<2^n$ will be said to be counting in limited binary.

It is an object of the present invention to provide an electronic counter for adding and subtracting, in which values are entered in true form whether the values are positive or negative so that the same value entry connections are employed when adding or subtracting. This has the advantage that no alteration is required to be made to connections external of the counter when adding or subtracting data obtained by reading punched cards in which the data is recorded in true form with an indication of sign.

One of the objects of the invention is to provide an electronic counter comprising a plurality of triggers connected in cascade for straight binary registration of an initial value and being provided with means for altering the straight binary registration to registration in another radix and means are also provided for selectively adding or subtracting a succeeding value which includes means for rendering said altering means ineffective.

Another object is to provide a counter comprising a plurality of triggers connected in cascade for binary registration of values and means for selectively adding or subtracting a succeeding value including means for advancing the registration of said counter by an amount equal to the difference between a desired radix and the full binary capacity of said counter.

Another object is to provide a counter comprising a plurality of triggers connected in cascade and operative to register a chosen value and means for selectively adding or subtracting values including means for preventing interoperation among said triggers.

Still another object is to provide an electronic counter comprising a plurality of electronic devices, each operable to either of two sustained electrical conditions, to represent by the combined conditions of the respective devices a value entered in said counter, and means for producing subtraction within said counter including means for reversing all the first assumed individual conditions of the electronic devices.

According to the invention, an electronic counter, adapted to have a value registered therein by the application of electrical impulses, is characterized by means being provided for inverting the registered value to the complemental value so that values entered in constant form may be added or subtracted from the registered value.

By way of illustration, the invention will be described in connection with a counter of the general type disclosed in said British Patent No. 609,502, to which reference may be made for a detailed description of the mode of operation of the trigger circuits.

Throughout the specification the term "electronic" will be used in a limited sense of denoting circuits employing high vacuum tubes.

Other objects of the invention will be pointed out in the following description and claims and illustrated in the accompanying drawings, which disclose, by way of examples, the principle of the invention and the best mode, which has been contemplated, of applying that principle.

In the drawings:

Figure 3 is a circuit diagram of the counter shown in Figure 2.

Figures 5 and 5A are circuit diagrams of two pulse emitters and control valves and Figure 6 shows a readin and readout circuit for the counter.

Figure 1:
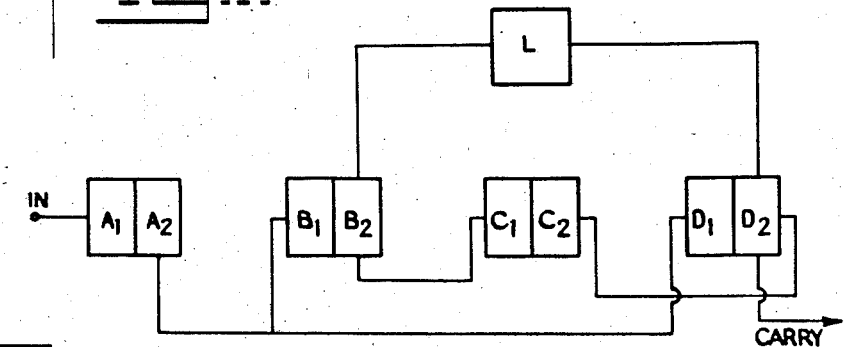
Figure 1 is a block diagram of a decimal adding counter.

In Figure 1 the blocks A1 and A2 represent the two tubes of trigger stage A. When the trigger is "off," tube A2 is conducting and A1 non-conducting and similarly for trigger stages B, C and D. Normally, whenever a pulse is applied to one of the triggers, the state of the trigger is reversed. When a trigger switches from "on" to "off," an operative pulse is applied to the next succeeding stage.

The trigger stages A, B, C and D represent, when "on," the digits 1, 2, 4 and 8, respectively. In order to make the counter operate in the decimal notation, a lock tube L between stages D and B and a connection between trigger stages A and D are provided. The lock tube L serves to prevent operation of trigger B when trigger D is "on" and the connection between triggers A and D is operative to switch D only from the "on" to the "off" state and not vice versa. Thus, briefly, the counter operates as a normal binary counter up to 8, at which point trigger D is switched "on," causing lock tube L to become effective to block operation of trigger B. The ninth pulse switches trigger A to the "on" state. The tenth pulse switches trigger A "off" but the resulting pulse from trigger A cannot switch trigger B because of lock tube L, but does switch trigger D "off," providing a pulse to the next denomination on the line marked "Carry" and returning the counter to zero.

Figure 2:
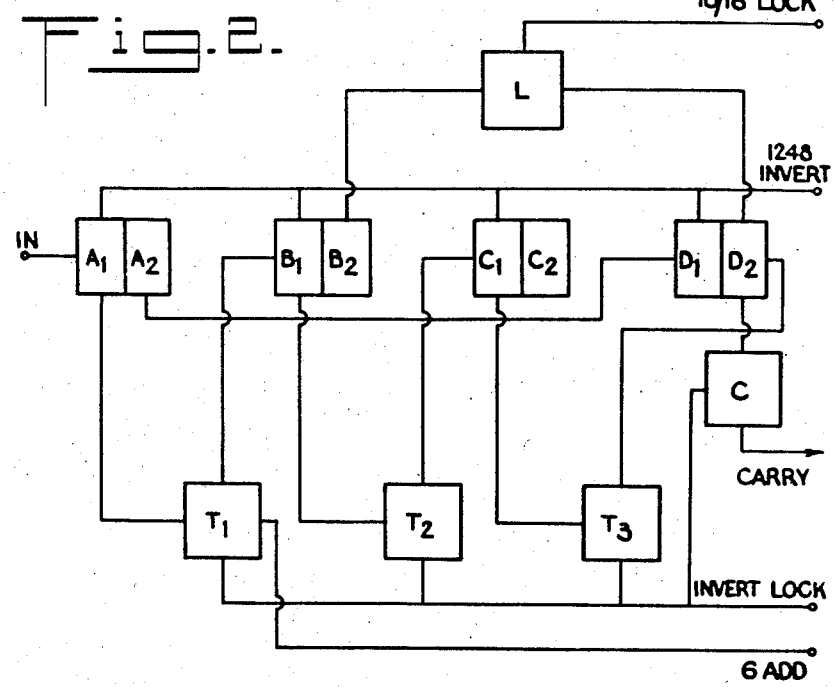
Figure 2 is a block diagram of a decimal counter for performing addition or subtraction.
Figure 2:
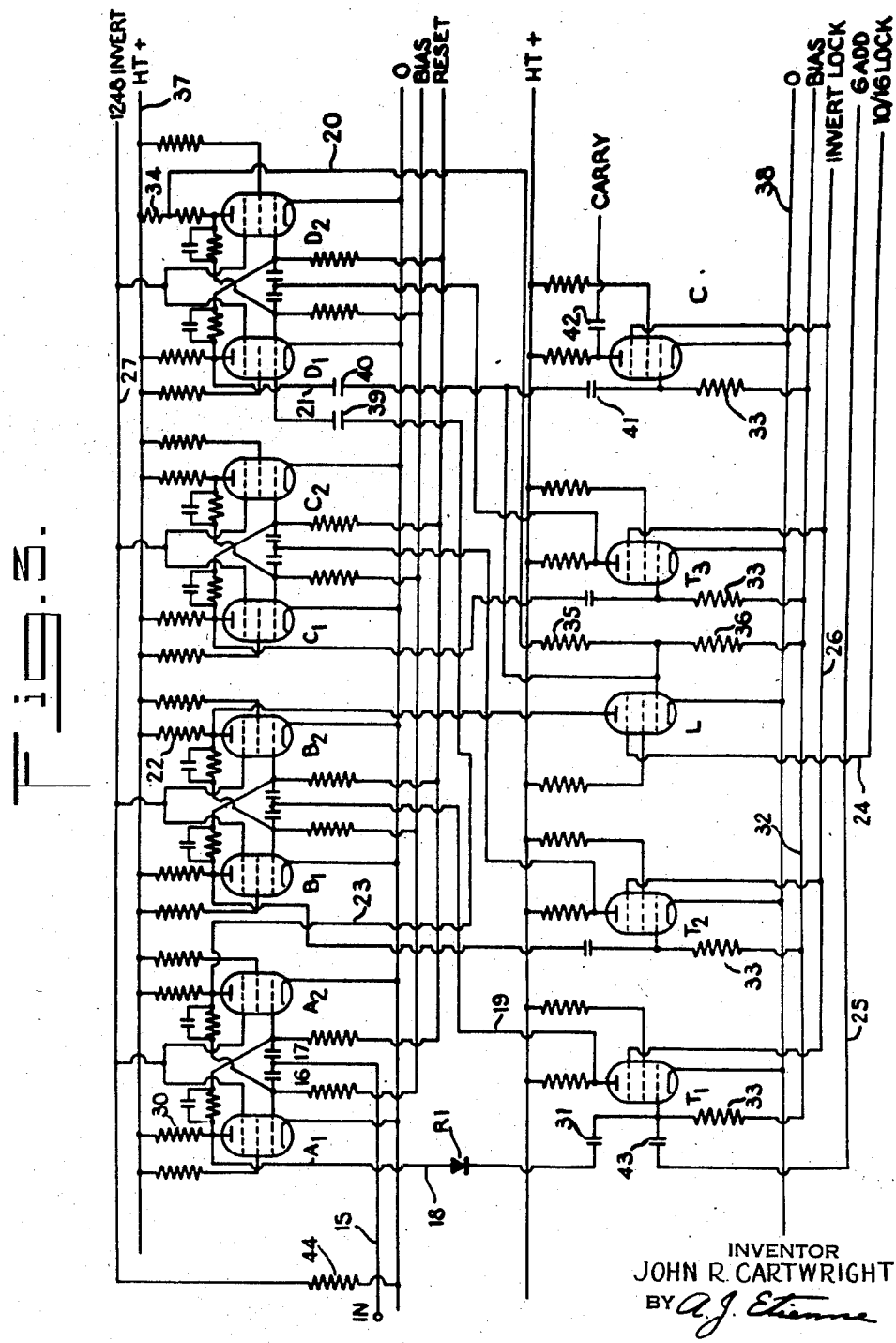

Figure 2 shows a block diagram of a counter of one denomination capable of both addition and subtraction, the method of limiting the counter capacity to ten being essentially that described above. Assuming that a positive number has been entered in the counter and that a smaller positive number is to be subtracted from it, then the counter is made to perform an "inversion cycle" before the entry of a second number, in order to convert the value standing in the counter to a 9's complement. As is well known, the addition of this second number to the complement of the first will produce the complement of the difference between the two numbers.

As a first step in the inversion cycle, a negative voltage is applied to the line "10/16 lock" to render the tube L inoperative whatever the condition of trigger D. Thus the counter is temporarily made to operate as a true binary counter. At step two, three pulses are applied on the line "6 add." These pulses are fed by the isolating tube T1 to trigger B to operate it three times. This trigger represents the value "2" so that a value of "6" has been added to the value already standing in the counter. Since the original value cannot have been greater than nine, and the counter is now operating as a binary counter in the scale of sixteen, no carry can occur out of the denomination as a result of the addition of "6."

At step three, a negative voltage is applied to the line "Invert lock," to render inoperative the isolating tubes T1, T2 and T3, and the carry tube C. Thus pulses are prevented from passing from one trigger to another or from trigger D to the carry line. At step four, a pulse is applied simultaneously to all four trigger circuits causing each of them to switch from the initially assumed state whichever it may be to the opposite state. Finally, the negative locking voltages are removed to again render all the tubes operative and the counter is ready to receive the entry of the second number.

Table 1 shows the values standing in the counter during the various steps of the inversion cycle when the initial entry in the counter is any number from "0" to "9" and that after the inversion cycle, the 9's complement of the original value remains in the counter. The values 1, 2, 4, 8, within brackets in the table, indicate which trigger stages are "on"; trigger A representing the value 1, trigger B representing 2, etc.

TABLE 1

| Initial entry | After addition of 6 | After trigger states have been reversed | Decimal value represented after inversion cycle |
|---|---|---|---|
| 0 | 6 (– 2 4 –) | (1 – – 8) | 9 |
| 1 | 7 (1 2 4 –) | (– – – 8) | 8 |
| 2 | 8 (– – – 8) | (1 2 4 –) | 7 |
| 3 | 9 (1 – – 8) | (– 2 4 –) | 6 |
| 4 | 10 (– 2 – 8) | (1 – 4 –) | 5 |
| 5 | 11 (1 2 – 8) | (– – 4 –) | 4 |
| 6 | 12 (– – 4 8) | (1 2 – –) | 3 |
| 7 | 13 (1 – 4 8) | (– 2 – –) | 2 |
| 8 | 14 (– 2 4 8) | (1 – – –) | 1 |
| 9 | 15 (1 2 4 8) | (– – – –) | 0 |

Figure 1A:
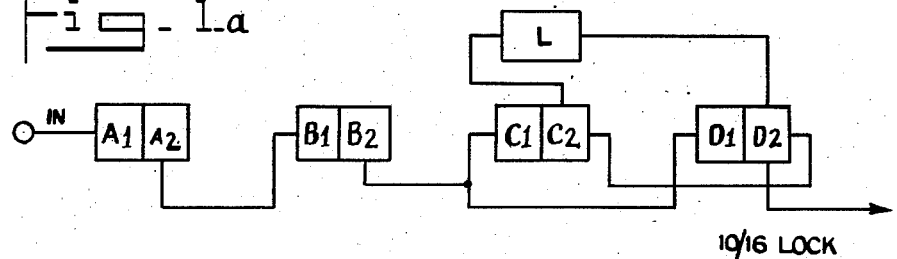
Figure 1a is a block diagram of a duo-decimal adding counter.

As shown in Fig. 1a, if lock tube L is connected to trigger C instead of trigger B, and the connection to trigger D made from trigger B, a total of 8+4 pulses will be required to cause the counter to pass from zero to the point when trigger D has emitted a carry pulse and the counter is again registering zero. Thus the counter is operating in the duo-decimal scale. Further, if the inversion cycle is carried out as explained, with the exception that the value 4 is added instead of 6, it will be seen that a complement to 11 is obtained. For example, if the initial entry is 6, then the values corresponding to those of the table are 6, 10 (– 2 – 8), (1 – 4 –), 5 or if the initial entry is 11 then the values are 11, 15 (1 2 4 8), (– – – –), 0.

If the lock tube L and the extra connection to trigger D are omitted, then the counter will operate as a true binary counter in radix 16. If the inversion cycle, as described above, is carried out, it will be found that the complement to fifteen is obtained in the counter. The value to be added in is "0" in this case, so that in practice step two of the cycle is suppressed.

From the examples given, it will be seen that the same cycle is carried out in each case with the exception that the value to be added in, at step two, for any particular radix is made equal to $2^n-R$, where $n$ is the number of binary trigger stages and R is the radix of the system in which the counter is working.

Figure 3 is a detailed circuit diagram of the counter of Figure 2. Although pentodes are employed in the trigger stages of the counter in lieu of triodes, the operation of the trigger stages is similar to that of the circuits described in British Patent No. 609,502, to which reference may be had for a detailed description.

When the first entry pulse is applied via line 15 and the condensers 16 and 17 to the grids of the pentodes A1 and A2, trigger stage A is switched "on" (A1 conducting as assumed above). As a result of pentode A1 becoming conducting, the potential drop across resistor 30 increases and a negative pulse is transmitted via line 18, rectifier R1 and condenser 31 to the control grid of pentode T1. This pulse is attenuated by the rectifier. T1 is biased to cut off by the connection of its control grid to the bias line 32 through resistor 33, so that the negative pulse applied to its grid produces no output at the anode.

The second entry pulse on line 15 switches trigger stage A back "off" to normal so that a positive pulse is produced at the anode of A1. This pulse is transmitted to the control grid of T1 by line 18 to thus produce a negative pulse at the anode of this tube, which, via line 19 connected to the grids of the pentodes B1 and B2, causes trigger stage B to switch on. In similar manner, successive trigger stages will be switched "on" and back to normal by successive input pulses, up to the ninth. Trigger stage D is switched "on" at the eighth entry pulse. With pentode D2 non-conducting, the potential drop across resistor 34 is decreased. The resistors 34, 35 and 36 form a potential divider between line 37 and line 32, so that when the potential drop across 34 decreases, the potential at the junction of resistors 35 and 36 becomes more positive. This increase is sufficient to make tube L, which is normally non-conducting, fully conducting. The conduction of tube L increases the potential drop across resistor 22 and reduces the anode potential of pentode B2 to such an extent that trigger stage B is not switched by the application of a negative pulse to its grids. In consequence, at the tenth entry pulse, the positive pulse applied via line 18 to tube T1 produces a negative pulse on line 19 which, since the block tube L is effective, is ineffective to switch trigger stage B. However, the negative pulse from the anode of pentode A1 via line 23 and condenser 39 is applied to pentode D1 to switch trigger D back to normal. Pentode D1 becomes non-conducting, so that a positive pulse is applied to the control grid of carry tube C via line 21 and condensers 40 and 41. This produces a negative pulse at the anode of pentode C, which is applied via condenser 42 to the entry line 15 of the next higher denomination. With pentode D2 conducting, the potential at the junction of resistors 35 and 36 becomes more negative, so that locking tube L is again rendered non-conducting and thus ineffective. Thus, after ten entry pulses, the counter registers zero and a carry has been directed to the next higher denomination.

When the value standing in the counter is to be inverted, the following operations are performed. It may be noted that normally the suppressor grids of all the pentodes are at approximately cathode potential.

*Step 1*

Line 24 is made negative in a manner subsequently described, with respect to line 38, so that anode current flow in lock tube L is prevented. Thus, L is no longer capable of acting as a lock tube, and the counter digit capacity is increased to sixteen.

*Step 2*

Three positive pulses produced as described presently are applied in succession to the control grid of tube T1 via line 25 and condenser 43. Thus three negative pulses will be applied to trigger stage B via line 19, to switch it three times and so enter the value six. The rectifier R1 attenuates the positive pulses, so that their amplitude on line 18 is insufficient to cause spurious switching of trigger stage A.

*Step 3*

A negative voltage produced as described presently is applied to line 26, so that the suppressor grids of pentodes T1, T2, T3 and C prevent anode current flow in these valves and hence prevent any pulses on the control grids being reproduced at the anodes.

*Step 4*

A negative pulse produced as described presently on line 27 is applied to all the suppressor grids of all the trigger stage tubes. This has the same effect as applying a negative pulse to the control grids and hence causes each trigger stage to switch over to the state opposite to that in which it was prior to the application of the pulse. At the end of Step 4, the lines 24 and 26 are returned to their normal potential.

Figure 4:
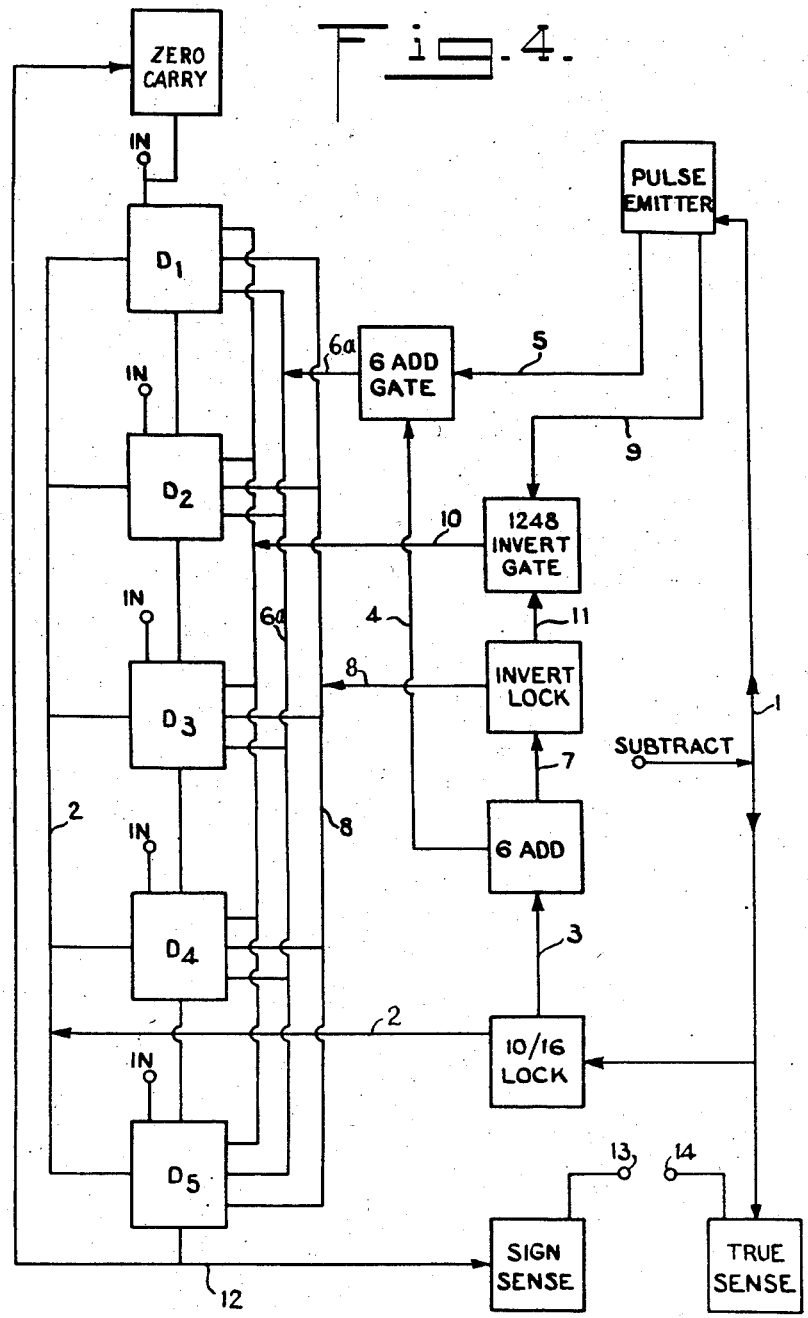
Figure 4 is a block diagram of a multi-denominational counter with electronic control circuits.

When a number of the counters operating according to the invention are combined to form a multi-denominational accumulator, such as might be used in connection with a computer or a card controlled accounting machine, it is necessary to provide for two further functions, entry of the so-called "fugitive one" when the accumulator passes through zero, due to an entry being made and sensing of the sign of the value standing in the accumulator. One method by which this may be carried out is shown in Figure 4.

Each of the blocks D1 to D5 represents a full counter such as shown in Figure 2, the whole forming a five denomination accumulator. Entries may be made into each denomination by applying the appropriate number of pulses to the points marked "In," in suitable manner. Suppose, by way of example, that the entries are being made under control of record cards being sensed in an accounting machine, the cards relating to credit and debit amounts. After a number of credit amounts have been entered in the accumulator, so that the accumulator contains the total of these amounts, a debit card may be sensed. This card will normally bear some designation marking, different from that of the credit card, to indicate that it is a debit card, and the sensing of this change of designation will in a well known manner cause a single negative impulse to be transmitted to the "Subtract" terminal, before the sensing of the numeric values. Similarly a change from a debit card to a credit card will produce a single negative pulse. It is this change and not the plus or minus sign of a factor that is employed to produce a single negative pulse.

The impulse produced on line 1, due to the impulsing of the "Subtract" terminal, switches over a trigger circuit marked "True sense" from the "off" to the "on" state, and also switches a flip-flop stage marked "10/16 lock" to the "on" condition. The switching of this flip-flop causes a drop in voltage on line 2 which via line 24 (Fig. 3) is sufficient to render inoperative the lock tube L in each denomination. The impulse on line 1 also serves to put into operation the "Pulse emitter." This is a device which, on receipt of a starting pulse, emits in succession a specified number of pulses and then returns to a quiescent state until another starting pulse is received.

The "10/16 lock" flip-flop in switching over also sends a pulse on line 3 to switch the "6 add" flip-flop to the "on" condition. This flip-flop in the "on" condition serves to raise the potential of line 4 to make operative the tube marked "6 add gate," which is normally inoperative. The 6 Add flip-flop stays in the "on" condition sufficiently long to allow three pulses sent along line 5 by the pulse emitter to be amplified by the 6 Add Gate tube and appear on line 6a, and then switches off, rendering the tube inoperative, and preventing any further pulses appearing on line 6a. The pulses on line 6a are fed via line 25 (Fig. 3) to the isolating tubes T1 in each denomination, to cause the addition of six.

In switching off, the 6 Add flip flop sends a pulse on line 7 to switch on a further flip-flop marked "Invert lock." As a result, the potential of line 8 is lowered which via line 26 (Fig. 3) renders inoperative the isolating tubes T1, T2 and T3 and the carry tube C in each denomination. At the same time, the potential of line 11 is raised to render operative the tube marked "1 2 4 8 invert gate." The invert lock flip flop stays "on" sufficiently long for one pulse to be fed from the pulse emitter, along line 9 through the now operative invert gate tube, to line 10. Line 10 is connected via line 27 (Fig. 3) to all the trigger circuits in the counters and serves to reverse the state of all the trigger circuits, so that the accumulator now contains the complement of the number originally standing in the counter. At this time, the pulse emitter as described presently returns to a quiescent state having completed its cycle of operation, and the 10/16 lock flip-flop switches off. The accumulator is now ready to receive the numerical value read from the debit card in true form. After this entry, the accumulator will register the balance expressed in complemental form.

If several debit values are now entered in succession, the result may be a debit balance, in which case the counter will have passed through zero and will be registering the debit balance as a true figure. In order to obtain the correct value under these conditions, it is necessary that the "fugitive one" be added in to the counter whenever it passes through zero. The carry tube of the highest denomination D5 is connected to line 12, so that a pulse is applied through the tube marked "zero carry" to the units denomination whenever the highest denomination goes from "9" to "0" during entry operation.

The pulse on line 12 also serves to switch a trigger stage marked "Sign sense," which thus registers the fact that the accumulator is now registering a true value, which is actually a debit balance. If the initial entry to the accumulator is positive, then the sign sense trigger is set in the "off" condition and if the initial entry is negative, in the "on" condition. As already explained, the true sense trigger is switched from one condition to the other every time an impulse is applied to the "Subtract" terminal by a change from a credit to a debit or vice versa. Thus, in effect these two trigger circuits determine whether an odd or even number of inversion cycles have been called and whether the accumulator has passed through zero an odd or even number of times. By sensing in combination the terminals 13 and 14 which indicate the state of the two trigger stages it is possible to determine whether the value standing in the accumulator represents a positive or negative value, and whether it is standing in true or complemental form. The meaning of the possible combinations is set out in Table 2.

TABLE 2

| Sign sense trigger state | True sense trigger state | Value standing accumulator |
| --- | --- | --- |
| Off | Off | Positive value—true form. |
| Off | On | Positive value—complement form. |
| On | Off | Negative value—true form. |
| On | On | Negative value—complement form. |

When printing, for example, the value standing in the accumulator, this sensing may control the printing of appropriate sign indicating symbols. In addition, it may be used to initiate a final inversion cycle if the value is standing in complement and printing of the true value is required.

By the use of the sign sense and true sense trigger stages, any number of inversion cycles may be initiated while retaining an indication of the positive or negative status and true or complement form of the value standing in the accumulator. Since an inversion cycle is normally only required when the positive or negative status of the entry changes, and not for every negative entry, the number of such cycles is reduced to a minimum.

In connection with the entry of the "fugitive one," a carry from the highest denomination could also occur if an attempt were made to register a number greater than the capacity of the accumulator. Since exceeding the accumulator capacity would of itself lead to an incorrect total, it is to be assumed that this would be avoided.

In the preceding description, the terms "trigger" and "flip-flop," have been used to describe those two tube circuits, well known in the art, which have respectively two stable states, and one stable and one unstable state.

Figure 5 is a detailed circuit diagram of each of the control circuits shown in block diagram form in Figure 4.

The two triodes 46 and 47 form the 10/16 lock flip-flop. Triode 46 is normally conducting fully since the grid is connected to line 38 through resistor 53. The resistors 48, 50 and 52 form a potentiometer between line 37 and the bias line 32. With triode 46 conducting, the potential at the junction of resistors 50 and 52 is sufficiently negative with respect to line 38 to ensure that the anode current of triode 47 is cut off. When a negative pulse on line 1 is transmitted to the grid of triode 46 through condenser 54, the tube is cut off, the potential at the junction of resistors 50 and 52 rises and 47 conducts. This causes the anode potential to fall sharply, driving the grid of 46 even further below cut off potential. The flip-flop is then in the "on" state, with 46 non-conducting and 47 conducting. The grid potential of 46 starts to rise exponentially at a rate determined by the time constant of condenser 51 and resistor 53. When the grid potential passes the cut off value, tube 46 begins to draw anode current, the anode potential drops, making more negative the grid potential of triode 47. The reduced anode current which results, causes the anode potential to rise, thus tending, via condenser 51, to drive the grid of 46 more positive. The action is rapidly cumulative, so that the flip-flop switches back to normal with triode 46 conducting and 47 non-conducting.

The time constant of condenser 51 and resistor 53 is such that the flip-flop is "on" for the whole of the inversion cycle. The resistors 49, 55, and 56, form a potentiometer between line 37 and the negative voltage supply line 57 and when triode 47 is non-conducting, line 2 is very nearly at the potential of line 37. However, when triode 47 conducts, the anode voltage falls and the potential of line 2 becomes negative. Line 2 is connected via line 24 (Fig. 3) to the suppressor grids of the lock tubes L and when triode 47 conducts, line 2 becomes sufficiently negative to effect cut off of anode current in the tubes L.

When triode 46 becomes non-conducting, a positive pulse is transmitted via line 3 to the grid of the amplifier tube 58. This tube is normally biased to cut off by the connection of the grid to line 32 through resistor 59.

The negative pulse produced at the anode of tube 58 is applied to the grid of tube 60 of the 6 add flip-flop, comprising tubes 60 and 61. The negative pulse causes tube 60 to become non-conducting and the flip-flop to switch "on." The resistors 71, 62 and 63 form a potentiometer between line 37 and line 57, similar to that already described. Since tube 60 is normally conducting, the suppressor grid of pentode 67 of the 6 add gate is held below cut-off potential by the connection 4. When tube 60, however, becomes non-conducting, line 4 rises to very nearly the potential of line 37 and pentode 67 passes anode current since the grid is connected to line 38 through resistor 72. Negative pulses are applied to the grid of pentode 67 via line 5, so that positive pulses will appear at the anode of the pentode while anode current flows. The time constant of resistor 73 and condenser 74 is such that three pulses are produced at the anode of pentode 67 before the flip-flop switches back to normal, cutting off the anode current of 67 once more. These three pulses are applied to the control grids of pentode T1 via lines 6a and 25 (Fig. 3) to effect an entry of six.

When the 6 add flip-flop 60—61 switches back to normal, the negative pulse at the anode of tube 60 is transmitted via condenser 66 and line 7 to the grid of the normally conducting tube 70 of the invert lock flip-flop, comprising tubes 69 and 70, to switch it "on." In consequence, the potential of line 11 rises, enabling anode current to flow in pentode 68 of the 1 2 4 8 invert gate while the potential of line 8 drops. Line 8 is connected to line 26 of Figure 3 to effect cut off of the pentodes T1, T2, T3 and C. Pentode 68 is allowed to pass anode current sufficiently long for one positive pulse applied to its grid via line 9 to appear at the anode as a negative pulse, which is transmitted to line 27 (Figure 3) by line 10. The invert lock flip-flop 69 and 70 then switches back to normal and immediately afterwards the 10/16 lock flip-flop 46 and 47 also switches back to normal.

The flip-flop comprised by tubes 78 and 79 is also switched "on" by the negative pulse on line 1 and consequently the potential of the junction point of the resistors 80 and 81 rises in potential so that the grid potentials of the two multivibrator tubes 82 and 83 comprising the pulse emitter become equal. Prior to this rise in potential, the grid of tube 82 was sufficiently negative to prevent anode current flow, so that the multivibrator was inoperative. The multivibrator now operates to produce a substantially square waveform at the anodes of the tubes and this is applied via lines 5 and 9 to pentodes 67 and 68. However, the time constants of the resistor-condenser combinations 75, 72 and 76, 77 are short compared with the repetition frequency of the square wave, so that partial differentiation of the waveform takes place, producing a pulse waveform on the grids of 67 and 68.

The flip-flop 78 and 79 stays "on" for the same length of time as flip-flop 46 and 47, so that the multivibrator is operative for this period, but the pulses are effective to operate the counter only when gate tubes 67 and 68 are fully conducting. By utilizing this form of circuit, the timing of the waveform of the multivibrator relative to the remainder of the circuit operation is fixed. The two resistors 84 and 85 are equal in value, as are the two condensers 86 and 87.

The triodes 88 and 89 form the true sense trigger stage. Line 1 is connected to the grids of the two triodes so that each time a negative pulse is applied to the line, the trigger stage is switched over. The key 90 enables the trigger stage to be set up initially in the correct state. If the key is moved downward, then the junction of resistors 94 and 91 is connected to line 38, so that the trigger stage is set with triode 88 conducting. If the key is moved upward, the junction of 93 and 92 is connected to line 38 and the trigger stage is set with triode 89 conducting. This facility is desirable should it be required to enter a number in complement form. The sign sense trigger stage is similar to the true sense trigger stage.

Figure 5A shows a modified form of pulse emitter and control circuit which is more particularly suitable when it is required to operate the counter at high speeds.

The tubes 94 and 95 with their associated network of resistors and condensers form a trigger stage in which the tube 95 is normally conducting. The mode of operation of this stage is generally similar to those already described, although input pulses are applied separately to the two tubes and a condenser 117 of small value is connected between the two grids to provide a small amount of feedback and thereby render the stage more stable. The negative pulse on the subtract line 1 is applied to the grid of tube 95 to make this tube non-conducting and thereby switch the trigger stage "on." This same pulse is also applied to the grid of tube 107 of the trigger stage 106–107 to switch this stage "on." The resistors 120, 121 and 122 form a potentiometer between the H. T. line 37 and the main negative supply line 57. These resistor values are so proportioned that with tube 106 non-conducting, the potential of line 2 is only a volt or so negative with respect to line 38. However, when tube 106 conducts, the increased voltage drop across resistor 120 causes line 2 to become considerably negative with respect to line 38. Line 2 is connected via line 24 (Fig. 3) to the grids of all the lock tubes L, so that with tube 106 conducting, the anode current of the tubes L is cut off.

The tubes 114 and 115, together with resistors 127, 125, 128 and 126 and condensers 123 and 124, form a free-running multivibrator. The grid of tube 115 is connected via resistor 125 to the junction of the two resistors 130 and 131, which together with resistor 129, form a second potentiometer between lines 37 and 57. Thus while tube 107 is conducting, the grid of valve 115 is held negative, preventing the multivibrator functioning, but when the trigger stage 106—107 switches "on," the potential of the grid of 115 is brought to approximately that of line 38 and the multivibrator functions. The two tubes 113 and 116 are biased below cut off, so that only positive impulses applied to their grids are effective in producing an output at their anodes. Since the grids are connected to opposite anodes of the multivibrators, negative pulses will appear alternately at the anodes of 113 and 116 and hence on lines 118 and 119. After the multivibrator has come into operation, due to trigger stage 106—107 switching "on," the first negative pulse on line 118 will cut off tube 94 and cause trigger 94—95 to switch "off." The conduction of tube 95 will produce a negative pulse at the anode, which will be transmitted via condenser 129 to the grid of tube 97 to render it non-conducting and hence switch trigger stage 96—97 "on." The same pulse will also be transmitted via condenser 130 to the grid of tube 108, which is at zero bias, and will produce a positive pulse at the anode, which via lines 6a and 25 (Fig. 3) goes to the tubes T1 in each denomination (Figure 3). The next negative pulse, on line 119, will switch trigger stage 96—97 "off." This will cause trigger stage 98—99 to be switched "on" and a second positive pulse to appear on line 6a via tube 109. Similarly, the next pulse on line 118 will cause the switching "on" of trigger stage 100—101 and a third pulse on line 6a via tube 110. When trigger stage 100—101 is switched "off" by the pulse on line 119, trigger stage 102—103 is switched "on" via condenser 131 and trigger stage 111—112 is also switched "on" via condenser 132. The consequent conduction of tube 111 will cause line 8 connected to the potentiometer 133, 134 and 135 to drop in potential. Line 8 is connected via line 26 (Figure 3) to the suppressor grids of tubes T1, T2, T3 and C in each denomination, so that the anode current of these tubes is cut off.

Trigger stage 102—103 will be switched "off" by a pulse on line 118, producing a negative pulse at the anode of tube 103 which is applied via condenser 164 to switch "on" trigger stage 104—105 and via condenser 163 and lines 10 and 27 (Figure 3) to the suppressor grids of the trigger stages of each denomination to effect inversion. Trigger stage 104—105 will be switched "off" by a pulse on 119 and the negative pulse at the anode of tube 105 switches "off" triggers 106—107 and 111—112, and thus again preventing operation of the multivibrator. The control has now gone through a complete cycle, returned to the initial state and is ready to be set in operation once more by another negative pulse on the subtract line 1.

In Figure 6 are shown circuits which enable data to be read in to and read out of the counter, in the form of digit timed impulses. That is, a particular digit is represented by an impulse at a particular relative timing.

Such a form of representation occurs, for example, in the electrical sensing of perforated record cards.

The line 165 is connected to the sensing brush of a particular column, so that when a perforation is sensed, the brush making contact with the sensing roll in known manner, a positive impulse is applied via diode 136 and condenser 143 to the grid of tube 137. Due to inductive loads which may also be connected to the sensing voltage supply in a record card controlled machine, it is possible for spurious negative pulses to appear on line 165 and diode 136 prevents such pulses being applied to tube 137.

The tubes 137 and 138 form a trigger stage with tube 138 normally conducting. The impulse on line 165 will cause the trigger stage to switch "on," thus raising the potential of the control grid of pentode 139, which is connected to the junction of the two resistors 144 and 145. The suppressor grid of 139 is normally biased beyond cut off by the connection through resistor 146 to the negative supply line 57.

The commutator 148 has ten segments 147 and is driven in synchronism with the record card sensing mechanism, so that segment 147 (6), for example, is in contact with the commutator brush when a "6" value hole is being sensed. The suppressor grid of pentode 139 is connected to the commutator segments 147, so that it will be connected through the commutator to line 38 at each digit time or index point.

If a "6" hole is sensed, the trigger stage 137—138 will be switched "on," raising the potential of the control grid of 139 and at the same time, the bias on the suppressor will be removed by the connection to line 38 through the commutator 148, so that pentode 139 will conduct and a negative impulse will be produced at the anode. This pulse is applied to the first trigger stage of a counter denomination via a connection between line 154 and the input line 15 (Figure 3) to enter value "1." The action of the trigger stage 137—138 is so rapid in comparison with the time taken to traverse one segment of the commutator 148, that this commutator may be timed synchronously with the card sensing mechanism. The commutator brush will leave the segment 147 (6), thus restoring the suppressor grid bias on pentode 139. The resulting positive pulse on line 154 is ineffective to make an entry in the counter. At the "5" index point, the suppressor bias will again be removed and since the trigger 137—138 is still "on," a further negative pulse will appear on line 154. In similar manner, negative pulses will appear when the commutator brush contacts the remaining segments 147 (4) to 147 (1), so that a total of six pulses will have been entered into the counter under control of the value "6" hole. The trigger stage 137—138 is reset after the entry time by a pulse on line 152, derived from cam-controlled contacts or an electronic control circuit. No segment 147 (0) is required, since no entry is made in to the counter for value "0."

In order to read out, the trigger stage 140—141 and power tube 142 may be employed. When readout is to be effected, trigger stage 137—138 is set "on" at 1.5 index points before "9" time by a positive impulse on line 156.

The counter shown in Figure 3 is slightly modified by employing a separate control line for the suppressor grid of the carry tube C, so that this tube may be rendered inoperative without affecting the tubes T1, T2 and T3. For readout, the line 149 (Figure 6) is connected to the anode of the tube D1 (Figure 3) and tube C is rendered inoperative by a negative bias on the suppressor grid. When the segment 147 (10) contacts the commutator brush, the suppressor grid bias on tube 139 will be removed and since trigger stage 137—138 is already "on," a negative pulse will appear at the anode of 139 and be transmitted via line 15 (Figure 3) to switch the first trigger stage of the counter. Each succeeding segment contacting the brush will produce a further entry pulse to the counter denomination, so that a total of ten pulses will be applied.

If, for example, the value 7 is standing in the counter, then the segments 147 (10), (9) and (8) will add three pulses, making a total of ten in the counter. Since the counter is operating in decimal, a carry pulse will be produced as a positive pulse at the anode of tube D1. This will not affect the next denomination since carry tube C is inoperative, but will switch "on" trigger stage 140—141, via line 149. Tube 141 will become nonconducting, so that the potential of the junction of resistors 150 and 151 will rise, making tube 142 conductive. The conductive current of the tube will energize relay 155 in the cathode circuit, so that the relay contacts (not shown) will close. Thus by "7" time, the relay contacts will be closed and may be utilized to control the operation of a punch magnet or other recording means. Similarly, any other digit which may be registered by the counter will cause the relay contacts to be closed by the appropriate digit time to enable the correct timed read out. Since a total of ten pulses are entered, at the end of the read out cycle, the counter will have been returned to the initial registration.

In order to enable a binary counter to count in another notation such as decimal or duo-decimal, instead of employing a lock tube, the counter may have an initial entry made into it of the difference between the base of notation and the full capacity of the counter. Thus a counter employing stages representing the values 1, 2, 4, 8 and intended to count in decimal would have an initial entry of 6 made into it so that the carry would occur at 10. In this type of counter, each time that a carry occurs, this initial or "filler" entry is made. It will be appreciated that this filler entry will always be equal to the value entered in the first part of an inversion cycle so that no further entry need be made before the state of the counting trigger stages is reversed. However, in order to ensure that the counter operates in the decimal scale after the inversion cycle, the corrective entry of 6 in the case of decimal must be made after the trigger stages have been reversed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A pulse operated electronic counter comprising a plurality of electronic triggers connected in cascade and operable to represent a value entered therein, means for altering the normal cascade operation whereby operation in the normal radix is changed to operation in another radix means for entering a series of values successively in said counter, an electron valve circuit for inverting an entered value to its complement value means for selectively rendering said electron valve circuit inoperative or operative and means for rendering said altering means inoperative when said electron valve circuit is operative whereby subsequent pulses representative of a succeeding value may be selectively added or subtracted.

2. An electronic counter comprising a series of electronic triggers operable to represent an entered value, means for altering the normal cascade operation whereby operation in the normal radix is changed to operation in another radix means for entering a series of values successively in said counter, an electron valve circuit to operate said triggers to represent the complement value of an initially entered value means for selectively rendering said electron valve circuit inoperative or operative and means for rendering said altering means inoperative when said electron valve circuit is operative whereby a subsequent value may be selectively added or subtracted in the same form as the initially entered value.

3. An electronic counter comprising a series of cascade connected electronic triggers, means for altering the straight cascade operation of said triggers, means for operating said triggers to represent by their altered operation an initially entered value, means for inverting the indication of an entered value to its complement value and including means for reversing the initial stable condition of each of said triggers and means for rendering said altering means inoperative during said inversion whereby a value initially entered is now represented as its complement value.

4. An electronic counter comprising a series of four cascaded triggers, means interconnecting certain of said triggers and operable to alter the operation from operation in the radix 16 to operation in the radix 12, and means including an electron valve circuit, for reversing the initial stable condition of each of said triggers and means rendering said altering means inoperative during said reversal whereby a value initially entered in the radix 12 may be represented as its 11's complement.

5. An electronic counter comprising a plurality of electronic triggers connected in cascade, means for altering the normal cascade operation whereby operation in the normal radix is changed to operation in another radix, means for changing said counter operation from additive to subtractive and means including a pulse source and means for limiting the number of effective pulses from said source for invariably entering a number of pulses equal to the difference between the normal radix and the other radix when said counter is subtractively operated.

6. An electronic counter as in claim 5, and including means for blocking the operation of said altering means prior to addition of said difference pulses.

7. An electronic counter as in claim 5, and including means for blocking operation of said triggers subsequent to the addition of said difference pulses.

8. An electronic counter as in claim 5 and including means for blocking the operation of said altering means prior to said addition of pulses, means for blocking the operation of said triggers subsequent to said addition of pulses, and means for reversing the initially assumed status of each trigger.

9. An electronic counter comprising a series of four electronic triggers operable in cascade, means comprising a blocking tube connected to the second and fourth triggers to block normal cascade operation of said triggers under selective control of said fourth trigger, means for rendering said blocking means ineffective to so block, and means for reversing the initial stable state of each of said triggers.

10. An electronic counter comprising a series of four electronic triggers operable in cascade, means comprising a blocking tube connected between the third and fourth triggers to block normal cascade operation of said triggers under selective control of said fourth trigger, means for rendering said blocking means ineffective to so block, and means for reversing the initial stable state of each of said triggers.

11. An electronic counter comprising a plurality of electronic triggers connected in cascade, each including a pair of cross-coupled pentodes, and means for inverting the initially assumed state of each of said triggers after an initial entry comprising means for applying pulses to all of the suppressors of said pentodes.

12. An electronic counter comprising a plurality of cascade coupled electronic triggers, means for altering the straight cascade operation of said triggers whereby an initial entry is registered by said counter in altered cascade operation of the respective triggers, means rendering said altering means inoperative during one full operation of said counter, means ascertaining the plus or minus character of a subsequent entry, and means controlled by a change in sign between said initial and subsequent entries for operating said rendering means.

13. An electronic counter comprising a plurality of cascade coupled electronic triggers, means for altering the straight cascade operation of said triggers whereby an initial entry is represented by the sustained state of said triggers assumed in other than straight cascade operation, a source of pulses, means for metering said pulses and applying them to said counter to enter a chosen number therein, and means for ascertaining the plus or minus character of a subsequent entry and operative upon change of sign between said initial and said subsequent entries, said last means initiating operation of said pulse metering means and rendering said altering means ineffective.

14. In combination, a counter, means for selecting values to be entered in said counter and entering same, means automatically ascertaining a change in sign between successive ones of said selected values, and means controlled by said ascertaining means upon such change in sign for inverting, within said counter, one of said selected values entered therein to its complement indication.

15. A device as in claim 14 and including means for indicating the positive or negative nature of an entered value.

16. A device as in claim 14 and including means to indicate the true or complement nature of an entered value.

17. An electronic counter comprising a plurality of electronic triggers connected in cascade, electronic means coupling the respective triggers, electronic means for altering the straight cascade operation of said triggers, means for rendering said altering means and coupling means inoperative and means subsequently operative for individually reversing the assumed status of each of said triggers.

18. An electronic counter comprising a plurality of electronic triggers connected in cascade, electronic means coupling succeeding triggers for permitting said cascade operation, electronic means for altering said straight cascade operation, means for entering a metered number of pulses into said counter, and means for inverting the individually assumed status of each trigger after an initial entry, said means including means rendering said coupling means and altering means inoperative prior to but operative subsequent to, entry of said metered number of pulses.

19. A binary decade counter comprising a plurality of straight binary operative pentode triggers, means for converting the straight binary operation of said pentode triggers to another radix, and inversion means for controlling subtraction within said counter, said means including means for rendering said converting means inoperative and means for applying a reversing voltage to a grid of each of said pentodes.

20. An electronic counter comprising four triggers connected in cascade, blocking means for converting the straight binary operation to decade operation, and means for producing subtraction within said counter comprising means rendering said blocking means ineffective, means selectively operating said triggers to thus insert a value six to said counter, means preventing interaction between said triggers and means thereupon effective to reverse the individual state of each of said triggers.

21. An electronic counter comprising a plurality of triggers connected in cascade, means for converting the straight binary operation of said counter to decade operation, means including additional triggers for indicating the true or complement nature of an entry and the positive or negative nature thereof, and means controlled by said additional triggers for producing an indication of the form and algebraic sign of said entry.

References Cited in the file of this patent

UNITED STATES PATENTS

| | | |
|---|---|---|
| 2,364,540 | Luhn | Dec. 5, 1944 |
| 2,386,481 | Lang | Oct. 9, 1945 |
| 2,422,698 | Miller | June 24, 1947 |
| 2,444,042 | Hartley et al. | June 29, 1948 |
| 2,462,275 | Morton et al. | Feb. 29, 1949 |
| 2,489,325 | Ridler | Nov. 29, 1949 |
| 2,500,294 | Phelps | Mar. 14, 1950 |
| 2,502,360 | Williams | Mar. 28, 1950 |
| 2,536,955 | Palmer | Jan. 2, 1951 |

FOREIGN PATENTS

| | | |
|---|---|---|
| 609,502 | Great Britain | Oct. 1, 1948 |

OTHER REFERENCES

"The Logical Design of the Raytheon Computer," Bloch et al., Mathematical Tables and Other Aids to Computation, vol. 3, No. 24, October 1948, pages 286 to 295.

"A Digital Computer for Scientific Applications," pp. 1452–1460; West et al., Proc. I. R. E., December 1948.